United States Patent [19]
Ito

[11] Patent Number: 5,995,786
[45] Date of Patent: Nov. 30, 1999

[54] IMAGE FORMING APPARATUS

[75] Inventor: Nobuyuki Ito, Shizuoka-ken, Japan

[73] Assignee: Canon Kabushiki Kaisha, Tokyo, Japan

[21] Appl. No.: 09/037,970

[22] Filed: Mar. 11, 1998

[30] Foreign Application Priority Data

Mar. 11, 1997 [JP] Japan .................................... 9-074472

[51] Int. Cl.⁶ ........................... G03G 15/24; G03G 15/02
[52] U.S. Cl. ............................................ 399/150; 399/175
[58] Field of Search .................................. 399/149, 150, 399/175, 174

[56] References Cited

U.S. PATENT DOCUMENTS

| | | | |
|---|---|---|---|
| 4,800,147 | 1/1989 | Savage . | |
| 5,751,405 | 5/1998 | Aita et al. | 355/269 |
| 5,752,146 | 5/1998 | Sato | 399/284 |
| 5,774,769 | 6/1998 | Chigono et al. | 399/176 |

FOREIGN PATENT DOCUMENTS

| | | |
|---|---|---|
| 0 844 536 | 5/1988 | European Pat. Off. . |
| 0 735 435 | 10/1996 | European Pat. Off. . |
| 0 805 378 | 11/1997 | European Pat. Off. . |
| 63-149669 | 6/1988 | Japan . |
| 6-3921 | 1/1994 | Japan . |

*Primary Examiner*—William Royer
*Assistant Examiner*—Greg Moldafsky
*Attorney, Agent, or Firm*—Fitzpatrick, Cella, Harper & Scinto

[57] ABSTRACT

An image forming apparatus includes an image bearing member; a charger for charging the image bearing member, the charger including a magnetic brush including magnetic particles contacted to the image bearing member; a developing device for developing an electrostatic image on the image bearing member, wherein the developing device includes a developer carrying member which is press-contacted to the image bearing member, and is movable in a direction opposite from a movement direction of the image bearing member at a portion where they are press-contacted to each other.

7 Claims, 6 Drawing Sheets

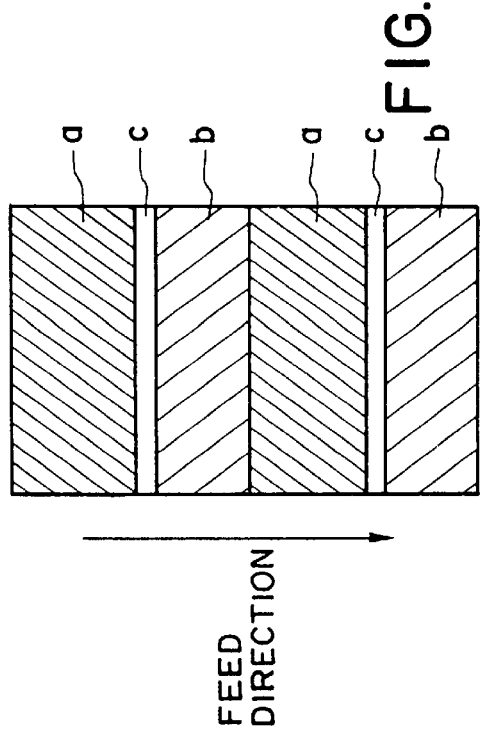
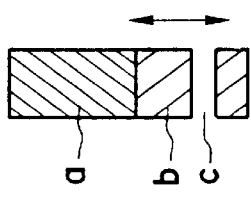
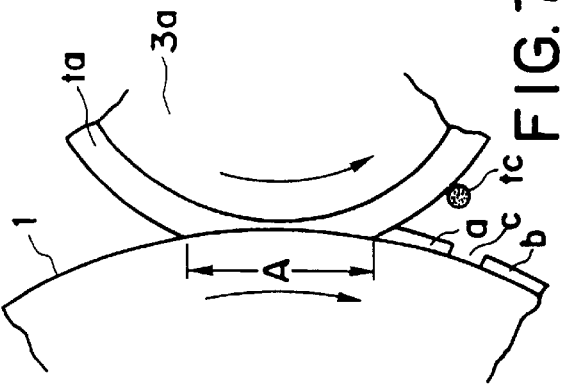
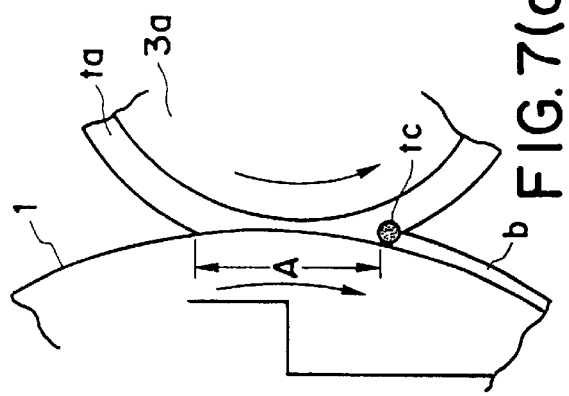
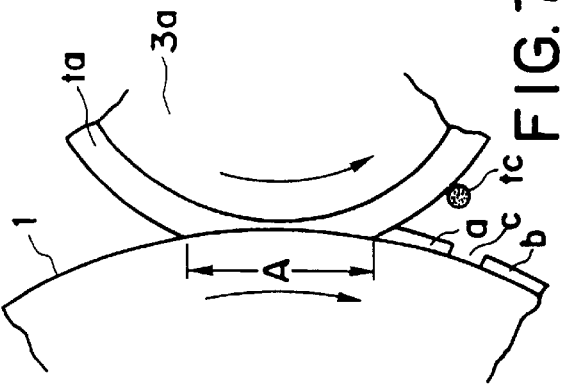

IMAGE FORMING APPARATUS

FIELD OF THE INVENTION AND RELATED ART

The present invention relates to image forming apparatuses such as copying machines or printers, in particular, to electrophotographic image forming apparatuses.

In the past, "corona based charging systems", which employ a corona discharging device, have been used as a means for charging (inclusive of discharging) an image bearing member or the like in image forming apparatuses. In recent years, however, charging apparatuses which employ a "contact type charging system" have been put to practical use. Further, apparatuses which employ a "contact type direct charge injection (charge injection) system" and do not generate ozone have been also developed.

(a) Corona Based Charging System

This is a system in which a corona discharging device is placed immediately adjacent to, but without any contact with, an object to be charged, and the object to be charged is exposed to the corona discharge from the corona discharging device so that the peripheral surface of the object is charged to a predetermined polarity and a predetermined potential level.

(b) Contact Type Charging System

This system is of a type in which an electrically conductive member (charging member) in the form of a roller, a blade, a brush, a magnetic brush, or the like is placed directly in contact with an object to be charged, and voltage is applied to the charging member to charge the peripheral surface of the object. This system was developed to reduce the amount of electrical power necessary to charge an object, and also the amount of ozone generated while an object is charged. Among the contact type charging systems, the systems which employ an electrically conductive roller have come to be widely used. This is because these electrically conductive roller based charging systems are stable in performance, and generate only a very small amount of ozone, that is, 1,000th the amount generated by a typical corona based charging system, which makes them very desirable to be used in environments such as business offices.

In the roller based charging System, an electrically conductive elastic roller (charge roller) is placed directly in contact with an object to be charged with the use of a predetermined contact pressure, and voltage is applied to the roller to charge the object.

More specifically, the object is charged through electrical discharge which occurs between the charging member and the object to be charged, and therefore, the voltage to be applied to charge the object must be greater than the threshold voltage required to initiate electrical discharge. For example, when the object to be charged is an electrophotographic photosensitive member with a 25 $\mu$m thick organic conductor layer, and the charging member pressed against the photosensitive member is a charge roller, the surface layer of the photosensitive member is charged if the voltage applied to the charging roller is in a range above approximately 640 V, and in this voltage range above approximately 640 V, the relationship between the level of the voltage applied to the charge roller, and the surface potential level to which the photosensitive member is charged, is linear with an inclination of one to one. This threshold voltage at and above which an object to be charged is charged is defined as charge start voltage (discharge start voltage) $V_{th}$.

In other words, in order to charge the peripheral surface of the photosensitive member to a potential level of $V_d$ which is necessary for electrophotographic, the DC voltage to be applied to charge the photosensitive member must be greater than $V_d$; it must be $V_d+V_{th}$ or greater. This system of applying only DC voltage to a contact type charging member to charge an object is called a "DC charging system".

However, with the use of the DC charging system, it has been difficult to accurately charge a photosensitive member to a desired potential level. This is due to the fact that the resistance value of a contact type charging member changes in response to changes in ambience or the like, and also, the peripheral surface of the photosensitive member as an object to be charged is gradually shaved, that is, the thickness of the surface layer of the photosensitive member is changed, as the photosensitive member is repeatedly used for image formation, and as a result, the charge start voltage $V_{th}$ changes.

Japanese Laid-Open Patent Application No. 149,669/1988 discloses an invention, in which in order to uniformly charge an object, an oscillating voltage is applied to a contact type charging member; in other words, an "AC charging system" is employed. More specifically, the oscillating voltage (the value of which periodically changes over time) is a compound voltage composed by superposing an AC component (alternating current voltage component) having a peak-to-peak voltage of $2 \times V_{th}$ or higher to a DC voltage, which is equivalent to the desired potential level $V_d$ to which the peripheral surface of an object is to be charged. The object of this invention is to take advantage of the averaging effect of the AC component to uniformly charge an object. In the case of this AC charging system, the potential of the object to be charged converges to the center, that is, $V_d$, between the peaks of the applied AC voltage, without being affected by ambient disturbances.

However, in the cases of contact type charging systems such as those described above, whether they are DC charging systems or AC charging systems, they fundamentally rely on the electrical discharge which occurs between a charging member and an object to be charged, requiring that the value of the voltage to be charged to a charging member to charge the object to a desired surface potential level of $V_d$ is no less than the value of $V_d$. As a result, ozone is generated, although the amount may be small. Further, there are new problems. In addition to the generation of ozone, when the AC charging system is employed for the sake of charge uniformity noises (charging noises) occur as a charging member and an object to be charged are caused to vibrate by the electrical field generated by AC voltage. In addiction there is the accelerated deterioration of the peripheral surface of the object to be charged, which is caused by the electrical discharge.

(c) Contact Type Charge Injection System

Japanese Laid-Open Patent Application No. 3,921/1994 discloses an innovative charging system (contact type charge injection system, or simply, charge injection system), in which electrical charge is directly injected into an object (photosensitive member) to be charged.

According to this charging system, an object to be charged is provided with a charge injection layer, that is, a surface layer into which electrical charge is injectable, and as voltage is applied to a contact type charging member such as a charge roller, a charge brush, a magnetic charge brush, or the like, electrical charge is directly injected into the electrically conductive particles contained in the surface layer of the photosensitive member as an object to be charged.

In this contact type charging system, electrical discharge is not used, and therefore, the level of the voltage necessary to charge an object has only to be equivalent to the level of the potential to which the object is to be charged. Thus, the amount of the ozone generated during the charging of an object is reduced to an amount as small as one tenth, or less, of the amount generated when a typical contact type charging system employing a charge roller is used, which makes this contact type charging system superior.

The contact type charging systems such as this contact type charging system can be also classified into two categories: a DC application type (DC charge system), in which only DC voltage is applied to a contact type charging member, and an AC application type (AC charge system), in which voltage comprising an AC component is applied to a contact type charging member. More studies have been made, particularly in recent years, for the AC charge system than for the DC charge system, since the AC charge system is more stable, or reliable, than the DC charging system, in terms of how stable, or reliable a system is when operational ambience is unstable, and also in terms of the deterioration associated with long term usage of a contact type charging member.

It has been known that in the cases of contact type charging systems, in which a magnetic brush is employed to apply voltage to a contact type charging member to create charge bias, the amount of ozone generated while an object is charged is not as much as in the case of the contact type charge systems such as the system described in Paragraph (b) in which a charge roller or the like is used to apply DC voltage.

This is thought to be due to the following reason. In the case of the contact type charging systems in which a cylindrical solid member such as the charge roller in the roller type charging system is placed in contact with an object to be charged, there are always gaps between the surfaces of the charge roller and an object to be charged, through which electrical discharge can occur, whereas in the case of the contact type charging systems in which a magnetic brush (contact type charging member) constituted of aggregated magnetic particles (magnetic carrier) is used to charge an object, there is virtually no gap between the surface of the magnetic brush and the surface of the object. More specifically, in the case of the contact type charge injection system with a magnetic brush, as DC or AC voltage is applied, a large amount of magnetic particles, which are fluidal, become charged and are attracted into the spaces, or gaps, between the surfaces of the contact type charging member and the object to be charged, by the electric charge injected into the object to be charged, aggregating in the form of a brush, which provides a much larger interface between the charging member and the object to be charged, than that provided by a typical charge roller; the magnetic brush and the object to be charged remain almost perfectly in contact with each other, leaving virtually no gap through which electrical discharge can occur.

Also in recent years, contact type developing systems in which single component developer is used along with an electrically conductive elastic roller as a developing member, which is pressed against an image bearing member, have come to be used as a means for developing electrophotographic latent images on the image bearing member. These systems place a development electrode extremely close to the surface of the latent image, and therefore, are advantageous in terms of image quality, reduction in apparatus size and cost, ease of maintenance, colorization, etc.

Thus, demand has been increasing for image forming apparatuses which employ one of the aforementioned "contact type charge injection systems with a magnetic brush", which are very effective in reducing the amount of the ozone generated during the charging of an image bearing member, and also one of the aforementioned "nonmagnetic single component developer based contact type developing systems", which are advantageous in terms of image quality, reduction in apparatus size and cost, ease of maintenance, colorization, etc.

However, this desirable combination has a problem. That is, in the cases of the contact type charge injection systems with a magnetic brush, it is impossible to prevent the magnetic particles, the aggregation of which constitutes a magnetic brush, from leaking from the magnetic brush by a significant amount therefore, if a contact type charging apparatus which employs a magnetic brush type charge injection system is employed in an image forming apparatus which employs a contact type developing system, the magnetic particles which leak from the charging apparatus enter the interface between the developer carrying member of the developing apparatus and the image bearing member, damaging the thin charge infection layer (OCL), that is, the outermost layer of the image bearing member. As a result, the peripheral surface of the image bearing member is nonuniformly charged; in other words, insufficiently charged areas appear in the pattern of narrow strips which extend in the moving direction of the image bearing member.

Further, the contact type developing systems which employ an elastic roller have their own problems. One of the problems, which is more conspicuous when the peripheral surfaces of the developer carrying member and the image bearing member move in the same direction in the interface (development station) between the developing carrying member and the image bearing member, is that "whitening" phenomenon occurs. In other words, image density of the low to Intermediate density areas located immediately on the upstream side of the high density areas, relative to the moving direction of the peripheral surface of the image bearing member, unnaturally and drastically drops adjacent to the upstream edge of the high density areas.

More specifically, referring to FIG. 7, (a), which is a schematic depiction of the phenomenon, referential characters a and b designate a high density area and a low to intermediate density area, respectively, of an image which appears on the image bearing member as an electrostatic latent image on the image bearing member is developed. The narrow strips between the downstream edge of a high density area a and the upstream edge of a low to intermediate density area b are the "whitened" areas c, that is, the areas the image density of which is unnaturally and drastically low relative to the immediately adjacent areas.

This "whitening" is different from the "whitening" associated with the so-called edge effect, in that the location at which this "whitening" occurs moves as the difference between the moving speeds of the developer carrying member and the image bearing member increases, as depicted in FIG. 7, (b). The cause of this "whitening" will be described with reference to the schematic drawings in FIG. 7, (a), (b) and (c).

Designated by a referential figure 1 is an image bearing member (for example, rotative photo sensitive member); 3a, a developer carrying member (for example, elastic development roller); and designated by an alphabetic referential code ta is a layer of nonmagnetic single component developer coated, being thereby carried, on the developer carrying member 3a. The developer carrying member 3a is disposed so that the developer layer ta is placed in contact with the image bearing member 1. The nip formed by the peripheral surfaces of the developer carrying member 3a and the image bearing member 1 constitutes a development station A, in which the peripheral surfaces of the developer carrying member 3a and the image bearing 1 move in the same direction.

Referring to FIG. 7, (c), the developer particles, or toner particles, which fail to enter the development station A, or the nip formed by the peripheral surfaces of the developer carrying member 3a and the image bearing member 1, seem to aggregate at a location tb; toner particles are piled up at the location tb.

As the edge, that is, the border line between the high density area and the low to intermediate density area, of the latent image on the peripheral surface of the image bearing member 1 arrives at the location tb where toner particles have piled up, the piled toner particles are attracted by the edge of the latent image, being caused to enter the development station A as the peripheral surface of the developer carrying member 3a moves. In the development station A, the piled toner particles are moved at the same velocity as the velocity of the peripheral surface of the developer carrying member 3a. In this situation, if there is a difference between the velocities at which the peripheral surfaces of the developer carrying member 3a and the image bearing member 1, more specifically, if the velocity of the peripheral surface of the developer carrying member 3a is 200% greater than that of the image bearing member 1, the piled toner particles come out of the development station A, arriving at a location tc, ahead of the edge of the latent image, as depicted in FIG. 7, (d), after entering the development station A.

Incidentally, this location tc is the very location at which a latent image is developed when a contact type developing system is employed, and the development occurs mostly when the peripheral surfaces of the developer carrying member 3a and the image bearing member 1 separate from each other at the location tc. Further, it is not likely that the digital latent image, which is very precise, is developed at the aforementioned location tc where the piled toner particles are. Further, in the case of the image forming apparatus depicted in FIG. 7, the velocity of the peripheral surface of the developer carrying member 3a is greater (by 200%) than that of the image bearing member 1, and therefore, the piled toner particles which come out of the development station A are facing the latent image, on the areas with a potential level equivalent to half tone, and since the area with a potential level equivalent to half tone is not as strong in attraction as the edge which has pulled the piled toner particles into the development station A. As a result, the piled toner particles remain adhered to the developer carrying member 3a, and are carried away by the developer carrying member 3a, as depicted by FIG. 7,(e). Consequently, the peripheral surface of the image bearing member 3a is whitened, on the area which has been in contact with the piled toner particles; the area c is "whitened". This is one the problems, or weaknesses, of the image forming apparatuses which employ both of the aforementioned contact type charging system and contact type developing system. In other words, they are liable to be easily affected by the remnant of the preceding image forming cycle, such as the so-called sleeve ghost.

SUMMARY OF THE INVENTION

Accordingly, an object of the present invention is to provide an image forming apparatus which employs a magnetic brush type charging system and a contact type developing system.

Another object of the present invention is to provide an image forming apparatus in which the charge injection layer is not damaged by magnetic particles.

Another object of the present invention is to provide an image forming apparatus in which "whitening" does not occur.

These and other objects, features and advantages of the present invention will become more apparent upon a consideration of the following description of the preferred embodiments of the present invention, taken in conjunction with the accompanying drawings.

BRIEF DESCRIPTION OF THE DRAWINGS

FIG. 7 is a schematic drawing of the interface between an image bearing member and a developer carrying member, depicting the "whitening" phenomenon, and the cause thereof.

DESCRIPTION OF THE PREFERRED EMBODIMENTS

Hereinafter, the first embodiment of the present invention will be described with reference to FIGS. 1–4.

Figure 1:
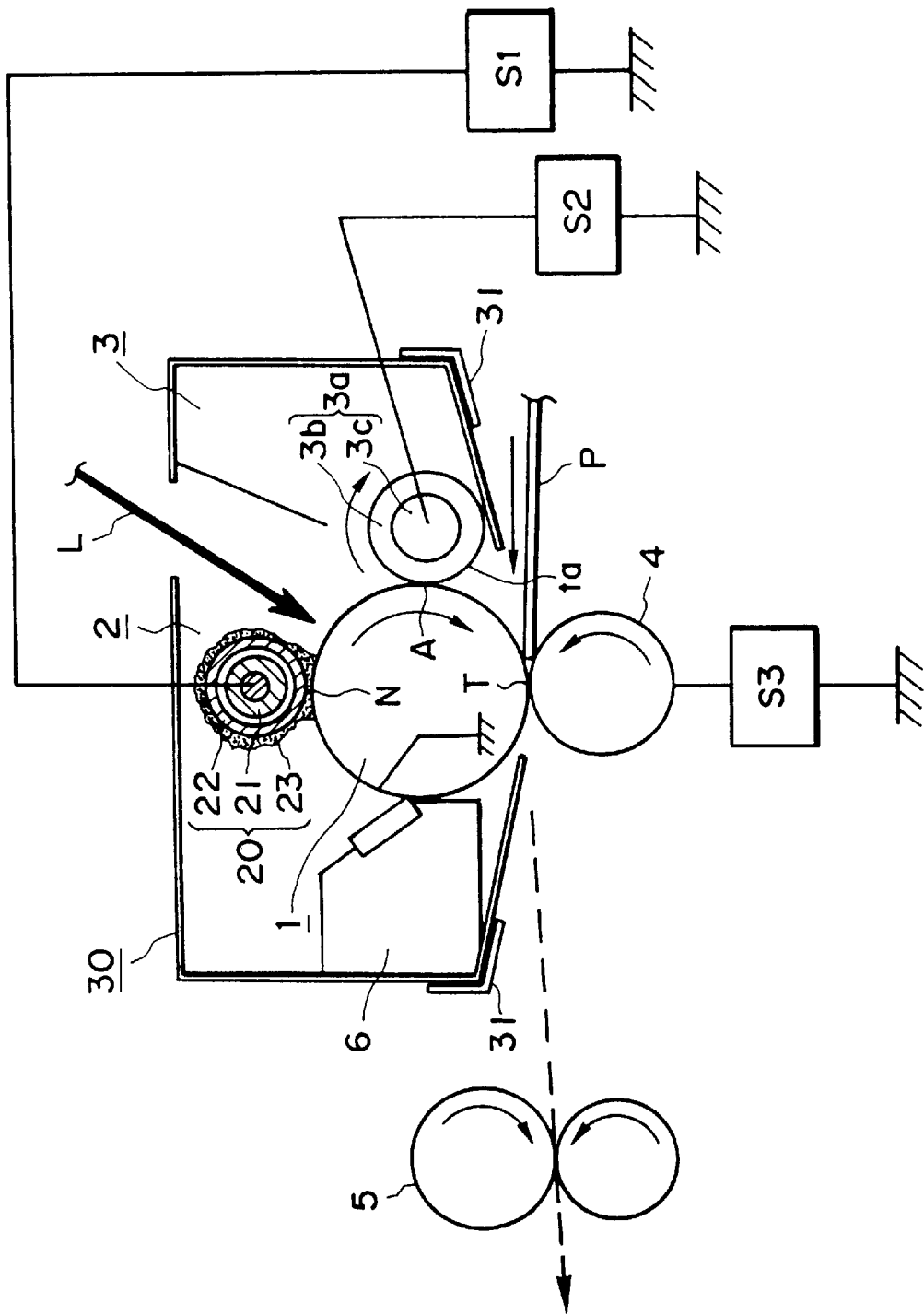
FIG. 1 is a schematic section of a typical image forming apparatus in accordance with the present invention.

FIG. 1 is a schematic section of a typical image forming apparatus in accordance with the present invention.

The image forming apparatus in this embodiment is a laser beam printer, which employs a transfer type electrophotographic process, a contact type charge injection system which uses a magnetic brush, a contact type developing system which uses single component nonmagnetic developer, and a cartridge system which uses a removably installable cartridge.

A referential figure 1 designates an electrophotographic photosensitive member (photosensitive drum) as an image bearing member, which is in the form of a rotative drum. The photosensitive member 1 is such a photosensitive member that has a charge injection layer as the outermost layer, composed of organic photoconductor, and is rotatively driven in the clockwise direction indicated by an arrow mark at a predetermined process speed (peripheral velocity).

Designated by a referential figure 20 is an electrically conductive magnetic brush (contact type charging member comprising a magnetic brush) as a contact type charging member, which is placed in contact with the photosensitive member 1. An alphanumeric referential code S1 designates an electrical power source from which charge bias is applied to the magnetic brush 20. The magnetic brush 20, the charge bias application power source S1, and the like, constitute a charging apparatus 2.

While the photosensitive member 1 is rotated, it is subjected to a primary charging process which employs a magnetic brush based contact type charge injection system As a result, the photosensitive member is uniformly charged to a predetermined polarity and a predetermined potential level by the electrically conductive magnetic brush 20 to which voltage is being applied.

The voltage applied to the magnetic brush 20 from the charge bias application power source S1 is a compound voltage composed by superposing an AC voltage with a peak-to-peak voltage $V_{pp}$ of 800 V and a frequency of 1 kHz onto a DC voltage of −700 V. Thus, electrical charge is injected into the photosensitive member 1, uniformly charging the peripheral surface of the photosensitive member 1 to an approximate potential level of −700 V.

This charged peripheral surface of the rotative photosensitive member 1 is exposed to a scanning laser beam L which is outputted from an unillustrated laser beam scanner as an exposing means, and the intensity of which is modulated with the sequential electric digital image signals which reflect the optical data of a target image. As a result, an electrostatic latent image, that is, a pattern created by dots, each of which reflects the corresponding image signal from the target image, is formed on the peripheral surface of the rotative photosensitive member 1.

The latent image is developed into a toner image by a developing apparatus 3. The developing apparatus 3 is a contact type developing apparatus which uses nonmagnetic single component developer.

An alphanumeric referential code 3a designates an elastic development roller as a developer carrying member, which is constituted of a metallic core 3c, and an electrically conductive cylindrical elastic layer 3b concentrically disposed on the peripheral surface of the metallic core 3c. The peripheral surface of the elastic development roller 3a is coated with a thin layer of nonmagnetic single component developer (toner layer ta). This elastic development roller 3a is disposed in such a manner that the toner layer ta is placed in contact with the photosensitive member 1 as an image bearing member. The nip formed by the elastic development roller 3a and the photosensitive member 1 constitutes a development station A. The elastic development roller 3a is rotatively driven in the clockwise direction indicated by an arrow mark to carry the toner to the development station A. Since the elastic development roller 3a as a developer carrying member and the photosensitive member 1 as an image bearing member are rotated in the same direction, their peripheral surfaces move in the opposite direction (counter direction), in the development station A in which the distance between the two surfaces becomes smallest. In the development station A, the toner carried on the rotative elastic development roller 3a makes contact with the peripheral surface of the photosensitive member 1, which is moving in the direction opposite to the moving direction of the peripheral surface of the development roller 3a. As a result, the electrostatic latent image on the photosensitive member 1 is developed into a toner image in this development station A.

To the elastic development roller 3a, DC voltage is applied from a development bias application power source S2, through the metallic core 3c, so that the toner particles carried on the elastic development roller 3a breaks away from the electrostatic confining force of the elastic development roller 3a to selectively adhere to the peripheral surface of the photosensitive member 1, in accordance with the pattern of the electrostatic latent image.

The value of the DC voltage applied to the elastic development roller 3a is between the values of the potentials equivalent to dark and light tones of the electrostatic latent image, which are −600 V and −100 V, respectively, in this embodiment. However, in order to prevent the fog creating toner particles from adhering to the areas with the dark tone potential, the absolute value of the DC voltage applied to the elastic development roller 3a is desired to be closer to the absolute value of the dark tone potential than to the absolute value of the light tone potential. In this embodiment, it is set at −500 V to develop an image. The amount of the developer to be carried to the development station A should be determined in consideration of the ratio between the peripheral velocities of the photosensitive member 1 and the elastic development roller 3a, and in this embodiment, the developer is fed so that the amount of the developer coated on the peripheral surface of the elastic development roller 3a becomes 0.1–1.0 mg/cm$^2$.

While a toner image is being formed on the peripheral surface of the photosensitive member 1, a transfer sheet P, as a final object (recording medium) on which an image is formed, is fed, with a predetermined timing, from an unillustrated sheet feeding station into the nip T (transfer nip) formed by the rotative photosensitive member 1, and a transfer charge roller 4, as a contact type transferring means, pressed upon the photosensitive member 1 with a predetermined contact pressure. To the transfer charge roller 4a predetermined transfer bias voltage is applied from a transfer bias application power source S3. The transfer sheet P is run through the transfer station T, being pinched between the photosensitive member 1 and the elastic development roller 3a. While the transfer sheet P is run through the transfer station T, the toner image which has been formed and borne on the rotative photosensitive member 1 is transferred, from the upstream end to the downstream end, on the top side of the transfer sheet P due to the electrostatic force and the pressure. In this embodiment, a transfer charge roller with an electrical resistance of 5×10$^8$ Ω is used as the transfer charge roller 4, and a DC voltage of +2,000 V is applied to transfer the toner image.

After receiving the toner image, the transfer sheet P is separated from the surface of the photosensitive member 1, and is guided into a fixing apparatus 5 which employs a thermal fixation system or the like. In the fixing apparatus 5, the toner image is permanently fixed to the transfer sheet P. Thereafter, the transfer sheet P with a permanently fixed toner image is discharged as a finished product (print or a copy) from the image forming apparatus.

After the toner image is transferred from the photosensitive member 1 onto the transfer sheet P, the peripheral surface of the photosensitive member 1 is cleaned by a cleaning apparatus (cleaner); the contaminants such as residual toner are removed from the peripheral surface of the photosensitive member 1 by the cleaning apparatus. Then, the photosensitive member 1 is repeatedly used for the following image formation.

The image forming apparatus in this embodiment comprises four processing devices: the photosensitive member 1, the magnetic brush based contact type charging member 20; the developing apparatus 3, and the cleaning apparatus 6, which are integrally disposed in a cartridge removably installable in the main assembly of the image forming apparatus so that they can be removably installed all at once in the main assembly of the image forming apparatus. Referential figures 31 and 31 designate guides which properly position a process cartridge in the main assembly of the image forming apparatus when the process cartridge is installed or removed, and which hold the process cartridge after the installation. The combination of the processing devices disposed in the process cartridge is not limited to the above described one.

(2) Photosensitive Member 1

The photosensitive member 1 as an image bearing member is a negatively chargeable organic conductor based photosensitive member, the outermost layer of which constitutes a charge injection layer. Its diameter is 30 mm. It is formed by coating the following first to fifth functional layers, in this order from the bottom, on an aluminum base member, and is rotatively driven at a process speed (peripheral velocity) of 100 mm/sec.

First layer: it is an undercoat layer constituted of an approximately 20 μm thick electrically conductive layer, and is coated to smooth out the defects of the aluminum base, and also to prevent the moire associated with the reflection of an exposure laser beam.

Second layer: it is a positive charge injection prevention layer, and plays a role in preventing the positive charge from the aluminum base from canceling the negative charge given to the surface portion of the photosensitive member 1. It is an approximately 1 μm thick layer of Amylan, the electrical resistance of which has been adjusted to approximately $10^5$ Ω·cm with the use of methoxylmethyl nylon.

Third layer: it is a charge generation layer constituted of an approximately 3 μm resin layer in which azo pigment has been dispersed. It generates charge couples composed of a negative charge and a positive charge as it is exposed to laser light.

Fourth layer: it is a charge transfer layer composed of P-type semiconductor created by dispersing hydrazone in polycarbonate resin. Thus, the negative charge given to the surface portion of the photosensitive member 1 is not allowed to transfer through this layer, and only the positive charge generated in the charge generation layer is allowed to transfer to the outermost layer of the photosensitive member 1.

Fifth layer: it is a charge injection layer constituted of a coated layer of photocurable acrylic resin in which microscopic particles of $SnO_2$ are dispersed. More specifically, microscopic particles, 0.03 μm in diameter, of $SnO_2$ doped with antimony to reduce electrical resistance thereof are dispersed in the resin at a ratio of 70% in weight, and the thus concocted mixture is coated by dipping to a thickness of 2 μm to form the charge injection layer.

Figure 2:
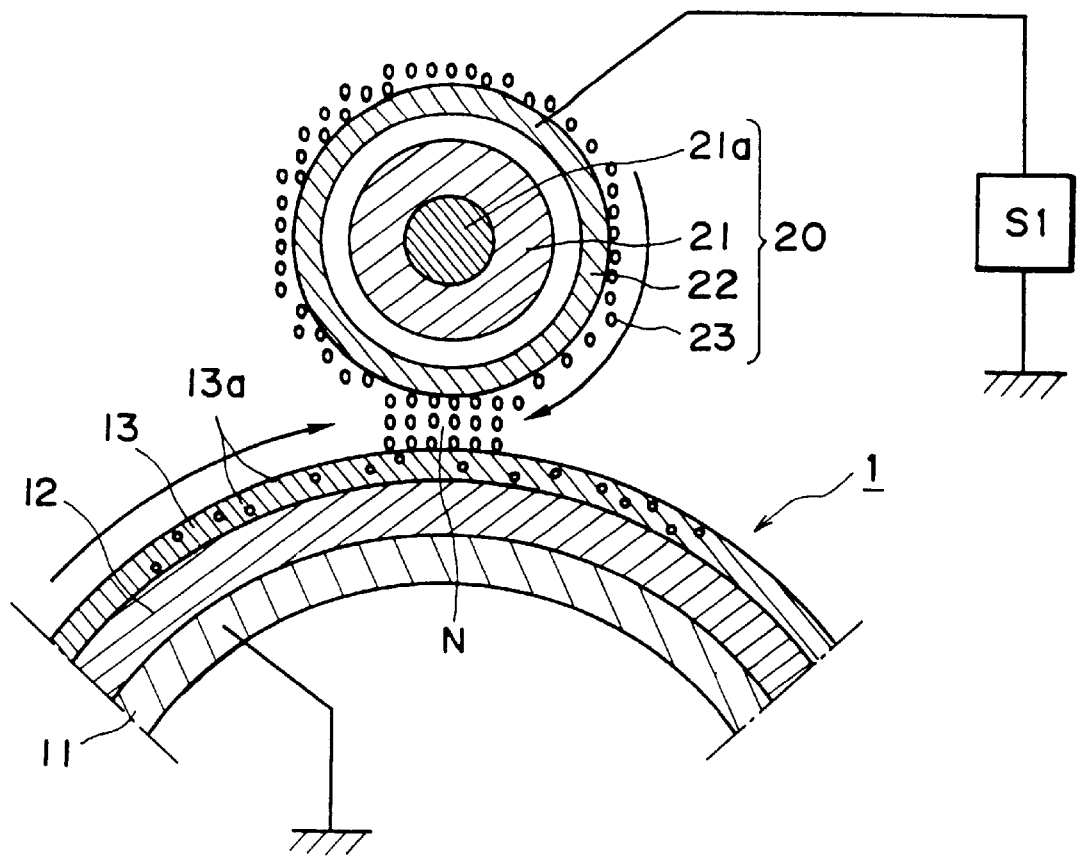
FIG. 2 is an enlarged schematic section of the interface between the surface layer portion of a photosensitive member, and an electrically conductive magnetic brush, and the adjacencies thereof.
Figure 3:
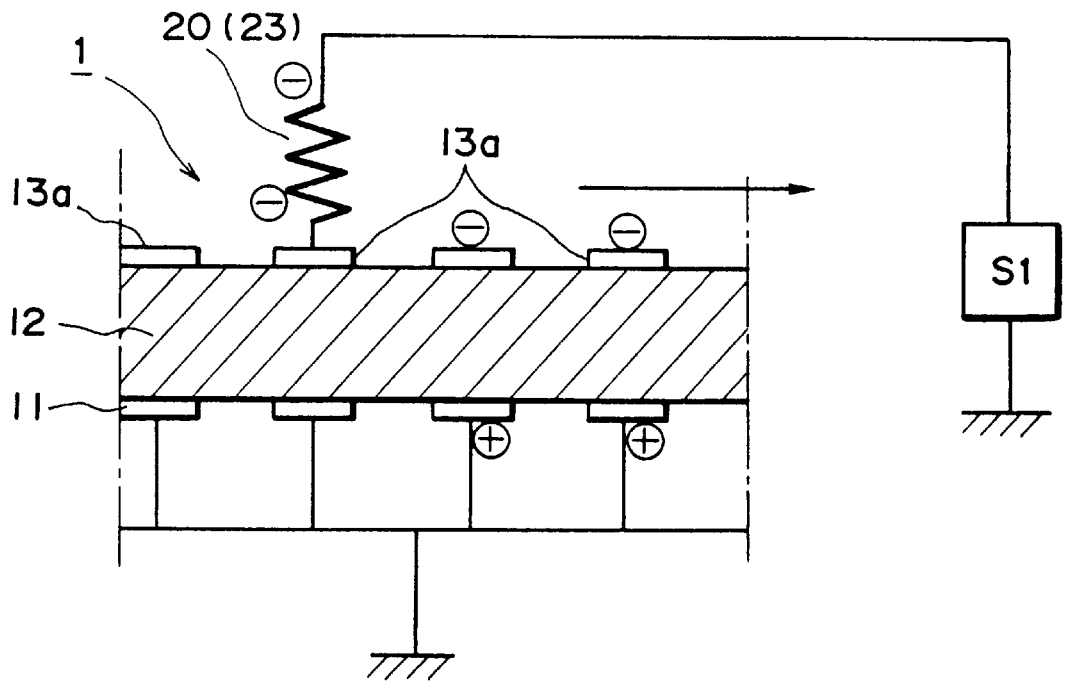
FIG. 3 is an equivalent circuit of a typical charge injection system.

Referring to FIG. 2, which is a schematic section of the peripheral surface portion of the photosensitive member 1, and the electrically conductive magnetic brush 20, depicting the structure thereof, a referential figure 11 designates an aluminum base of the photosensitive member 1; 12, the charge transfer layer: 13: the charge injection layer; and an alphanumeric referential code 13a designates each of electrically conductive particles ($SnO_2$) dispersed in the charge injection layer 13. The aforementioned undercoat layer, positive charge injection prevention layer, and charge generation layer, have been omitted from the drawing.

(3) Magnetic Brush 20

Referring to FIG. 2, the electrically conductive magnetic brush 20 as a contact type charging member in this embodiment comprises a magnet 21 fixed to a metallic core 21a, a nonmagnetic sleeve 22, which is rotatively fitted around the magnet 21, and functions as an electrode, a layer 23 of magnetic particles (magnetic carrier) held on the peripheral surface of the electrode sleeve 22 by the magnetic force of the magnet 21. The magnetic flux density of the magnet 21 at the peripheral surface of the electrode sleeve 22 is $800 \times 10^{-4}$ T (tesla).

The magnetic particle layer 23 has a thickness of 1 mm, and forms an approximately 5 mm wide charging nip N.

between the photosensitive member 1 and the nonmagnetic electrode sleeve 22. The total amount of the magnetic particles in the magnetic particle layer 23 is approximately 10 g. The smallest gap between the electrode sleeve 22 and the photosensitive member 1, in the charging nip N is 500 μm.

The electrode sleeve 22 is rotatively driven in the clockwise direction indicated by an arrow mark. As a result, the rotational direction of its peripheral surface in the charging nip N becomes opposite (counter) to the rotational direction of the peripheral surface of the photosensitive member 1. In the charging nip N. The magnetic particle layer 23 rotates with the electrode sleeve 22, rubbing the peripheral surface of the photosensitive member 1.

To the electrode sleeve 22 of the magnetic brush 20, a charge bias $V_{dC}+V_{AC}$ such as the aforementioned charge voltage is being applied, and as a result, charge is injected into the peripheral surface of the photosensitive member 1, uniformly increasing the potential of the peripheral surface of the photosensitive member 1 to approximately −700 V.

The ratio between the peripheral velocities of the magnetic brush 20 and the photosensitive member 1 is defined by the following equation:

Peripheral velocity ratio (%)={(magnetic brush's peripheral velocity−photosensitive member's peripheral velocity)/photosensitive member's peripheral velocity}×100

When the magnetic brush 20 is rotated in the counter direction, its peripheral velocity value is negative.

When the peripheral velocity ratio is −100%, which means that the magnetic brush is not rotating, the peripheral surface of the photosensitive member 1 is unsatisfactorily charged; the imperfection of the interface, or the charging surface, formed by the static magnetic brush and the moving peripheral surface of the photosensitive member 1 is reflected upon a finished image, as a pattern associated with insufficient charge. Given that the moving directions of the peripheral surfaces of the photosensitive member 1 and the magnetic brush 20 are the same in one apparatus, and are opposite to each other in another. Then, in order to make the peripheral velocity difference between the peripheral surfaces of the photosensitive member 1 and the magnetic brush 20 in the first apparatus, equal to that in the second apparatus, the revolution at which the magnetic roller 20 in the first apparatus must be substantially increased. Further, if the magnetic brush 20 is rotated at a slow speed while moving its peripheral surface in the sane direction as the direction in which the peripheral surface of the photosensitive member is moved, the magnetic particles of the magnetic brush 20 are liable to adhere to the photosensitive member 1. Therefore, the peripheral velocity ratio is desired to be no more than −100%. In this embodiment, it is set at −150%.

a) Magnetic Particles

As for the material for magnetic particles, which are coated on the peripheral surface of the electrode sleeve 22, the following are available.

(1) Combination of resin and magnetic powder such as magnetite powder; electrically conductive carbon or the like may be added to the combination to adjust its electrical resistance. These materials are kneaded and pulverized into particles.

(2) Sintered magnetite, and sintered ferrite; they may be deoxidized or oxidized to adjust their electrical resistance.

(3) The same particles as those listed in (1) and (2), except that their electrical resistances are adjusted to a proper value by coating them with coating material (phenol resin in which carbon is dispersed, or the like), the electrical resistance of which has been adjusted, or by plating them with metal such as Ni.

If the electrical resistance value of the magnetic particles is extremely high, electrical charge cannot be uniformly injected into a photosensitive member, leaving a large number of insufficiently charged microscopic areas, which effects foggy images. If the electrical resistance value of the magnetic particles is extremely low, current concentratedly flows through pin holes or the like defects, which are more liable to exist on the peripheral surface of a photosensitive member than not, causing the charging voltage to drop low enough to prevent the peripheral surface of the photosensitive member from being charged, which results in appearance of insufficiently charged areas, reflecting the pattern of the charging nip N.

The electrical resistance of the magnetic particle is desired to be in a range of $1 \times 10^4$–$1 \times 10^7$ $\Omega$.

As for the magnetic characteristics of the magnetic particles, the saturation magnetization of the magnetic particle is desired to be no less than 50 (A·m$^2$/kg) since the force which magnetically confines the magnetic particles should be reasonably strong in order to prevent the magnetic particles from adhering to a photosensitive member.

The magnetic particles actually employed in this embodiment were 30 $\mu$m in average particle diameter, $1 \times 10^6$ $\Omega$ in electrical resistance, and 58 (A·m$^2$/kg) in saturation magnetization.

The methods used in this embodiment to measure the electrical resistance, particle diameter, and saturation magnetization of the magnetic particle, and the method for calculating the average particle diameter of the magnetic particles, are as follows.

Method for measuring electrical resistance: two grams of magnetic particles are placed, being compacted, in a metallic cell (bottom area size=228 mm$^2$) to which voltage is applicable, and the electrical resistance of the magnetic particles is measured while applying a voltage of 1–1,000 V.

Method for measuring average particle diameter: The average particle diameter of the magnetic particles is expressed in the maximum cord length in the horizontal direction. No less than 300 magnetic particles are randomly selected with the use of a microscope, and their diameters were actually measured, and the mathematical average of the thus obtained values was used as the average particle diameter of the magnetic particles.

Method for measuring magnetic characteristic: An automatic DC magnetization B-H meter BHH-50 (Riken Electronic, Co. Ltd.) may be used to measure the magnetic characteristics, or B-H curve, of given magnetic particles. In measuring, approximately two grams of magnetic particles are packed in a cylindrical container, measuring 6.5 mm in internal diameter and 10 mm in height, to prevent the magnetic particles from moving, and the B-H curve of the magnetic particles is recorded. Then, the saturation magnetization for the magnetic particles is calculated from the recorded B-H curve.

b) Charging Principle

Charge injection is a process in which electrical charge is injected into the peripheral surface of an object with the use of a contact type charging member, and in which the electrical resistances of the charging member and the surface layer are intermediate. In this embodiment, not only is charge injected into the traps of the material for the surface layer of the photosensitive member as an image bearing member, but also into electrically conductive particles 13a in the charge injection layer 13.

Theoretically, electrical charge is injected into a microscopic condenser. More specifically, referring to FIG. 3, which is an equivalent circuit of a typical charge injection system, electrical charge is injected into microscopic condensers, the dielectric member of which is constituted of the charge transfer layer 12, and top and bottom electrodes Of which are constituted of the cylindrical aluminum base 11, and the electrically conductive particles 13a (SnO$_2$) in the charge injection layer 13, respectively.

In this case, the electrically conductive particles 13a are electrically independent from each other, acting as a sort of a floating electrode. In macroscopic terms, the peripheral surface of the photosensitive member seems to be covered with a blanket of uniform electrical charge. In reality, however, the photosensitive member is covered with an innumerably large number of charged electrically conductive particles 13a, and these particles 13a are independent from each other as described above. This is why the charged peripheral surface of the photosensitive member can hold the electrostatic latent image created as the surface is exposed to the scanning layer beam L.

(4) Method for Preventing Appearance of "whitened" area, or "missing toner white area", and method for preventing photosensitive member from being damaged by leaked magnetic particles.

Figure 4:
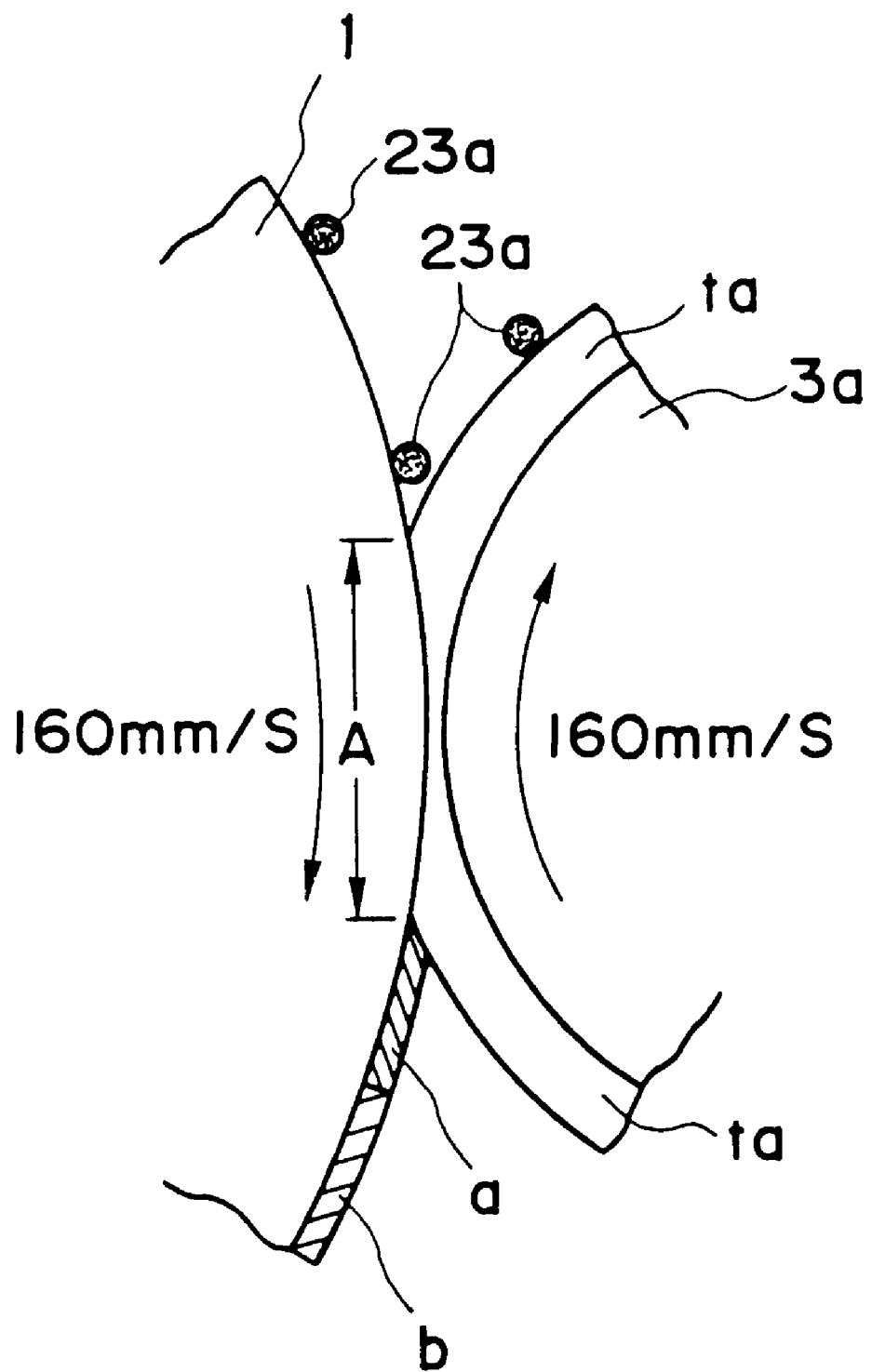
FIG. 4 is a schematic section of the interface between an image bearing member and a developer carrying member, depicting the counter-development mechanism.

Referring to FIG. 4, which is a schematic drawing of the interface between a developer carrying member and an image bearing member, and the adjacencies thereof, the development roller 3a as a developer carrying member, and the photosensitive member 1 as an image bearing member, are rotated in such a manner that the moving directions of their peripheral surfaces in the development station A, that is, where the distance between their peripheral surfaces is smallest, become opposite to each other. With this arrangement, the peripheral surface of the development roller 3a, which is moving in the direction opposite to the direction in which the peripheral surface of the photosensitive member 1 is moving, always brings a fresh layer ta of developer to the peripheral surface of the photosensitive member 1, on the downstream side of the development station A. relative to the moving direction of the photosensitive member 1; in other words, the latent image is counter rotatively developed. Therefore, even in the cases of image forming apparatuses, such as the one described above, the charging apparatus of which employs a magnetic brush based contact type charge injection system, and the developing apparatus of which employs a contact type developing apparatus which uses nonmagnetic single component developer, a development cycle is not affected by the remnant of the preceding development cycle, such as sleeve ghost. Further, the "whitening due to missing toner", that is, the phenomenon that the image density of the low to intermediate density areas b located adjacent to the high density areas a, of the image developed on a photosensitive member, drastically drops at, or adjacent to, the border between the two areas, does not occur. Therefore, it is possible to produce desirable images, the gradation of which is desirable across the entire range, from the lowest density to the highest density.

Further, since the peripheral surface of the development roller 3a moves in the direction opposite to the direction in which the peripheral surface of the photosensitive member 1 moves, the magnetic particles 23a which drop out of, or leak from, the magnetic brush 20 are carried away by the development roller 3a to the downstream side relative to the rotational direction of the development roller 3a, being prevented from entering the development station A, that is, the nip formed by the development roller 3a and the photosensitive member 1. Therefore, the charge injection layer 13, which is the thin surface layer of the photosensitive member, is prevented from being damaged by the leaked magnetic particles. As for the leaked magnetic particles, after being transferred onto the development roller 3a, they are caught, that is, removed from the development roller 3a, by a catching means which is placed in contact with, or immediately adjacent to, the development roller 3a, so that they do not create problems.

Thus, according to the present invention, it is possible to provide image forming apparatuses which do not suffer from such problems as the appearance of "white spots caused by missing toner", and the photosensitive member damage associated with the leaked magnetic particles, while employing a combination of the aforementioned charging means which are desirable in many ways, in particular, in terms of elimination of ozone generation, and the aforementioned developing means which is desirable in terms of image quality, and also in terms of size reduction, cost reduction, ease of maintenance, colorization, etc.

Figure 5:
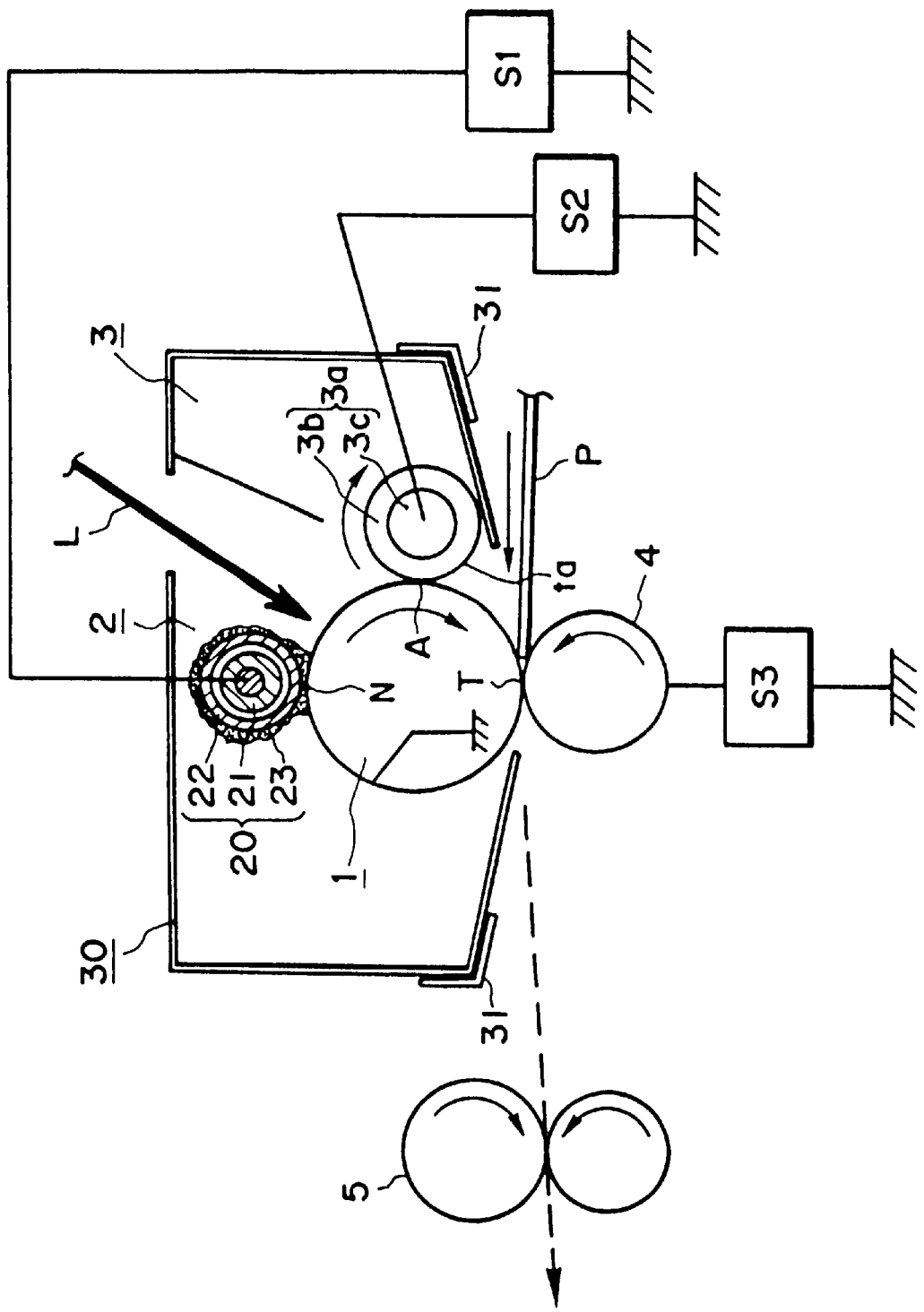
FIG. 5 is a schematic section of the cleanerless image forming apparatus in the second embodiment of the present invention.

Embodiment 2 (FIG. 5)

The image forming apparatus in this embodiment is a typical cleanerless image forming apparatus. FIG. 5 is the schematic section of the apparatus.

The image forming apparatus in this embodiment is substantially the same as the image forming apparatus (laser beam printer) in Embodiment 1, except for the elimination of the dedicated cleaning apparatus 6 (cleaner) which cleans the peripheral surface of the photosensitive member 1 after a toner image is transferred onto a transfer sheet P. Thus, in the case of the image forming apparatus in this embodiment, such toner particles that are charged by the transfer charge roller 4 to the polarity opposite to the normal polarity, and mix into, that is, are recovered by, the magnetic particle layer 23 of the electrically conductive magnetic brush, are triboelectrically charged by the magnetic particles in the magnetic particle layer 23, back to the normal polarity, being thereby expelled from the magnetic particle layer 23 onto the photosensitive member 1. This is made possible by adjusting the properties of the magnetic particles which are coated on the peripheral surface of the electrode sleeve to form the magnetic particle layer 23 of the electrically conductive magnetic brush 20, and the properties of the toner particles, so that the toner particles are triboelectrically charged by the magnetic particles, back to the normal polarity.

With this arrangement, in which the properties of the magnetic particles for charging means, and the properties of the toner particles, are adjusted to cause the toner particles to be triboelectrically charged to the normal polarity, the residual toner particles which are recovered by the magnetic particle layer 23 of the electrically conductive magnetic brush 20 are quickly expelled onto the photosensitive member 1, preventing the electrically conductive magnetic brush from remaining contaminated. After being expelled onto the photosensitive member 1 from the magnetic particle layer 23 of the electrically conductive magnetic brush 20, the residual toner particles are collected, that is, the photosensitive member 1 is cleaned, in the development station A by the developing apparatus 3 at the same time as a latent image is developed. The recovered residual toner particles are recycled. Thus, the image forming apparatus in accordance with this embodiment does not generate waste toner, being ecologically advantageous, and is simpler in structure.

Figure 6:
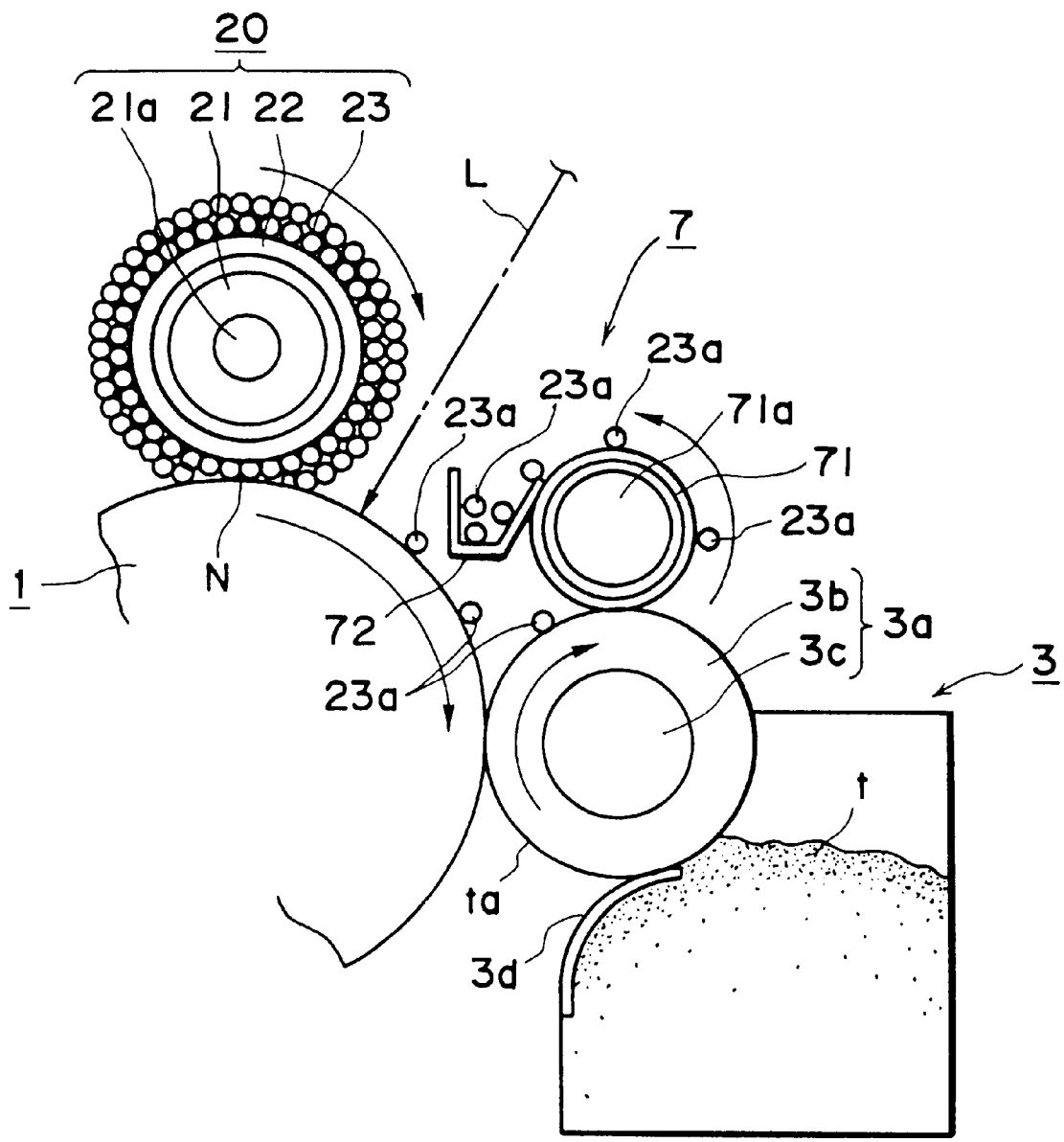
FIG. 6 is a schematic section of the essential portion of the image forming apparatus in the third embodiment of the present invention.

Embodiment 3 (FIG. 6)

In this embodiment, the image forming apparatus is provided with a means for collecting the leaked magnetic particles 23a. More specifically, after becoming separated from the magnetic particle layer 23 of the magnetic particle based contact type charging member 20, the magnetic particles are carried by the peripheral surface of the photosensitive member 1 to the next apparatus, that is, the developing apparatus 3, where they transfer onto the development roller 3a, and then are collected by a magnetic particle collecting means. FIG. 6 is a schematic section of the essential portion of such a means and the adjacencies thereof.

A referential figure 7 designates a means for collecting the magnetic particles from the charging apparatus. The image forming apparatus in this embodiment is substantially the same as those in Embodiments 1 and 2, except for the addition of the means for collecting the magnetic particles from the charging apparatus. More specifically, the image forming apparatus in this embodiment comprises a nonmagnetic sleeve 71 which functions as an electrode, and d collector-container 72 with a scraping blade. The nonmagnetic electrode sleeve 71 encases a magnet 71a, and is placed in contact with the elastic development roller 3a, being thereby rotated by the elastic development roller 3a, to attract the magnetic particles onto the peripheral surface thereof, and the magnetic particles attracted to the nonmagnetic electrode sleeve 71 are scraped into the collector-container by the blade.

In other words, as magnetic particles become separated (leak) from the magnetic particle layer 23 of the electrically conductive magnetic brush 20 as a contact type charging member, the leaked magnetic particles ride on the peripheral surface of the photosensitive member 1, and as the photosensitive member 1 rotates, they are carried to the next apparatus, that is, the developing apparatus 3, where they transfer to the elastic development roller 3a as an elastic developer carrying member.

After transferring to the elastic development roller 3a, the leaked magnetic particles 23a are adhered to the peripheral surface of the nonmagnetic electrode sleeve 71, which is in contact with, being thereby rotated by, the elastic development roller 3a, by the magnetic force of the magnet 71a encased in the sleeve 71. Then, they are scraped away from the peripheral surface of the sleeve 71 into the collector-container 72, by the blade of the collector-container 72.

In this embodiment, the magnetic flux density of the magnet 71a at the peripheral surface of sleeve 71 is 800× $10^{-4}$ T (tesla).

With the above arrangement, it is possible to prevent the development failure associated with the mixing of such magnetic particles that leak from the magnetic particle layer 23 of the electrically conductive magnetic brush 20, into the nonmagnetic toner t in the developing apparatus 3. Designated by an alphanumeric referential code 3d is an elastic blade which regulates the amount of the toner particles to be coated on the elastic development roller 3a.

The means or member 7 for collecting the magnetic particles 23a which have leaked and transferred onto the development roller 3a as a developer carrying member, may be disposed in such a manner that the peripheral surfaces of the nonmagnetic electrode sleeve 71 and the elastic development roller 3a come extremely close to each other, but do not make actual contact with each other.

Miscellaneous

1) In the preceding embodiments, the magnetic particle based contact type charging member 20 is of a type in which the electrode sleeve is rotated. However, it may be of a type in which a magnetic roller itself is rotated. In the latter case, the magnetic particle layer 23 is formed by holding the electrically conductive magnetic particles directly on the peripheral surface of a magnetic roller, or on the electrically conductive layer coated directly on a magnetic roller, by the magnetic force. Further, it may be a nonrotative magnetic brush.

2) The waveform of the AC voltage, or the AC component of compound voltage, applied to the magnetic particle based contact type charging member 20 or the like to provide it with bias is optional; it may be a sine wave, a rectangular wave, a triangular wave, or the like. Needless to say, the alternating bias may be provided by an alternating voltage in the form of a rectangular wave, which is generated by periodically turning on and off a DC power source. In this case, "to control AC bias" means "to control the peak-to-peak voltage of the alternating voltage". As is evident from the above description, any alternating bias is usable as long as its voltage value periodically changes over time.

3) The image bearing members to which the present invention is applicable are not limited to electrophotographic photosensitive members; they may be dielectric members or the like such as those in electrostatic recording.

4) The means for forming an electrostatic latent image on an image bearing member are optional Also, the choices for the exposing means are not limited to such digital exposing means that employs a scanning laser beam; they may be analog exposing means.

5) The present invention is compatible with various types of image forming apparatus, in addition to those described in the preceding embodiments; for example, image forming apparatuses which form images on an image bearing member in the form of an endless belt or the like, presenting them to users or audiences through a dedicated display section, and then remove the images from the image bearing member without transferring onto recording medium, to repeatedly use the image bearing member for image presentation, or image forming apparatuses which do not involve a transfer process, in other words, form image directly on final image bearing medium such as a sheet of photosensitive paper or electrostatic recording paper.

While the invention has been described with reference to the structures disclosed herein, it is not confined to the details set forth, and this application is intended to cover such modifications or changes as may come within the purposes of the improvements or the scope of the following claims.

What is claimed is:

1. An image forming apparatus comprising:

an image bearing member;

charging means for charging said image bearing member, said charging means including a magnetic brush comprising magnetic particles contacted to said image bearing member;

developing means for developing an electrostatic image on said image bearing member, where said developing means includes a developer carrying member which is press-contacted to said image bearing member, wherein the developer carrying member in a direction opposite from a movement direction of said image bearing member at a portion where they are press-contacted to each other, wherein said developing means includes collecting means for collecting the magnetic particles from said developer carrying member.

2. An apparatus according to claim 1, wherein said image bearing member is a photosensitive member having a charge injection surface layer.

3. An apparatus according to claim 2, wherein the charge injection surface layer contains electroconductive particles.

4. An apparatus according to claim 1, wherein the charging means includes a magnet for retaining the magnetic particles by magnetic force.

5. An apparatus according to claim 1, further comprising transfer means for transferring a developed image from said image bearing member onto a transfer material, wherein said charging means charges said image bearing member without occurrence of removal of residual developer after image transfer from said image bearing member.

6. An apparatus according to claim 1, wherein a developer carried by said developer carrying member is non-magnetic type component developer.

7. An apparatus according to claim 1, wherein said developing means removes a residual developer from said image bearing member simultaneously with developing the electrostatic image.

* * * * *

UNITED STATES PATENT AND TRADEMARK OFFICE
CERTIFICATE OF CORRECTION

PATENT NO. : 5,995,786

DATED : November 30, 1999

INVENTOR : Nobuyuki Ito

Page 1 of 2

It is certified that error appears in the above-identified patent and that said Letters Patent is hereby corrected as shown below:

COLUMN 1

Line 42, "System," should read --system,--.

COLUMN 2

Line 1, "electrophotographic," should read
   --electrophotography,--;
   Line 47, "addiction" should read --addition--; and
   Line 52, "3,921/1994" should read --3921/1994--.

COLUMN 4

Line 19, "infection" should read --injection--; and
   Line 33, "Intermediate" should read --intermediate--.

COLUMN 5

Line 52, "one" should read --one of--.

COLUMN 9

Line 21, "$10^5$" should read --$10^6$--;
   Line 49, "layer: 13:" should read --layer; 13,--; and
   Line 67, "nip N." should read --nip N,--.

COLUMN 10

Line 11, "1. In" should read --1 in--; and
   Line 45, "sane" should read --same--.

UNITED STATES PATENT AND TRADEMARK OFFICE
CERTIFICATE OF CORRECTION

PATENT NO. : 5,995,786

DATED : November 30, 1999

INVENTOR : Nobuyuki Ito

It is certified that error appears in the above-identified patent and that said Letters Patent is hereby corrected as shown below:

COLUMN 12

```
Line 5, "of" (first occurrence) should be deleted;
Line 7, "Of" should be deleted; and
Line 41, "A." should read --A,--.
```

COLUMN 14

```
Line 17, "d" should read --a--.
```

Signed and Sealed this

Fourteenth Day of November, 2000

Attest:

Q. TODD DICKINSON

Attesting Officer

Director of Patents and Trademarks